_US005866013A_

United States Patent [19]
Kessler et al.

[11] Patent Number: 5,866,013
[45] Date of Patent: Feb. 2, 1999

[54] METHOD FOR INHIBITING SCALE AND CONTROLLING CORROSION IN COOLING WATER SYSTEMS

[75] Inventors: Stephen M. Kessler, Fairless Hills; Donald T. Freese, Chadds Ford, both of Pa.

[73] Assignee: BetzDearborn Inc., Trevose, Pa.

[21] Appl. No.: 909,802

[22] Filed: Aug. 12, 1997

[51] Int. Cl.$^6$ ....................................................... C02F 5/12
[52] U.S. Cl. .......................... 210/701; 252/180; 252/395; 422/16; 422/17
[58] Field of Search .................................. 210/698–701; 252/180, 181, 395, 389.52, 389.2, 389.24; 422/15, 17, 19, 16

[56] References Cited

U.S. PATENT DOCUMENTS

| | | | |
|---|---|---|---|
| 4,659,482 | 4/1987 | Chen | 210/699 |
| 5,575,920 | 11/1996 | Freese et al. | 210/697 |
| 5,601,754 | 2/1997 | Carey et al. | 252/396 |

*Primary Examiner*—Peter A. Hruskoci
*Attorney, Agent, or Firm*—Alexander D. Ricci; Richard A. Paikoff

[57] ABSTRACT

A method and composition for simultaneously controlling the deposition of scale and the formation of corrosion in a cooling water system comprising adding to the system a combination of (a) a water soluble copolymer having the structure:

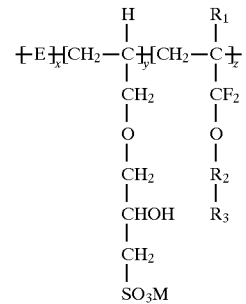

wherein $R_1$ is H or lower ($C_1$–$C_4$) alkyl, F is $H_2$ or O, M is a water soluble cation, $R_2$ is $(CH_2—CH_2—O)_n$,

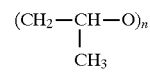

or mixture of both, n is an integer of from 1 to about 40, $R_3$ is H, lower ($C_1$–$C_4$) alkyl or an acetate, and (b) a water soluble polymer characterized by the structural formula:

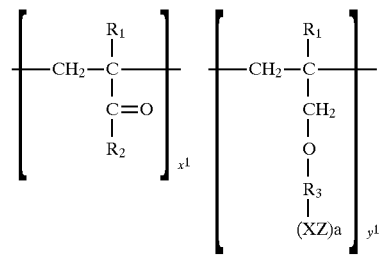

wherein $R_1$ is H or lower alkyl ($C_1$–$C_3$); $R_2$ is OH, OM, or $NH_2$; M is a water soluble cation; $R_3$ is a hydroxy substituted alkyl or alkylene radical having from 1 to 6 carbon atoms or a non-substituted alkyl or alkylene radical having from 1 to about 6 carbon atoms; X is an anionic radical; Z is H or hydrogens or a water soluble cation or cations which together counterbalance the valence of X, and a is 0 or 1.

10 Claims, No Drawings

METHOD FOR INHIBITING SCALE AND CONTROLLING CORROSION IN COOLING WATER SYSTEMS

FIELD OF THE INVENTION

The present invention pertains to a method of inhibiting corrosion and scale formation on heat transfer surfaces in contact with the water in a cooling water system.

BACKGROUND OF THE INVENTION

The problems of corrosion and scale formation and attendant effects have troubled water systems for years. For instance, scale tends to accumulate on internal walls of various water systems, such as cooling systems, and thereby materially lessens the operational efficiency of the system.

Deposits in lines, heat exchange equipment, etc., may originate from several causes. For example, precipitation of calcium carbonate, calcium sulfate and calcium phosphate in the water system leads to an accumulation of these scale imparting compounds along or around the metal surfaces which contact the flowing water circulating through the system. In this manner, heat transfer functions of the particular system are severely impeded.

Corrosion, on the other hand, is a degradative electrochemical reaction of a metal with its environment. Simply stated, it is the reversion of refined metals to their natural state. For example, iron ore is iron oxide. Iron oxide is refined into steel. When the steel corrodes, it forms iron oxide which, if unattended, may result in failure or destruction of the metal, causing the particular water system to be shut down until the necessary repairs can be made.

Typically, in cooling water systems, the formation of calcium sulfate, calcium phosphate and calcium carbonate, among others, has proven deleterious to the overall efficiency of the cooling water system. Recently, due to the popularity of cooling treatments using high levels of orthophosphate to promote passivation of the metal surfaces in contact with the system water, it has become critically important to control calcium phosphate crystallization so that relatively high levels of orthophosphate may be maintained in the system to achieve the desired passivation without resulting in fouling or impeded heat transfer functions which would normally be caused by calcium phosphate deposition.

Internal treatment, i.e., treatment of the water fed to the system, is necessary to prevent, reduce and/or retard formation of the scale imparting compounds and their resultant deposition. The carbonates of magnesium and calcium are not the only problem compounds as regards scale but also waters having high contents of phosphate and sulfate ions either occurring naturally or added for other purposes cause problems since calcium and magnesium, and any iron or copper present, react with each and deposit as scale. As is obvious, the deposition of scale on the structural parts of a cooling water system causes poorer circulation and lower heat transfer capacity, resulting accordingly in an overall loss in efficiency.

Many conventional scale and corrosion inhibitors exhibit acceptable utility at temperatures up to about 120° F. heat transfer surface temperature. However, beyond that temperature their effectiveness deteriorates. This operating temperature limitation and other problems have been overcome by the present invention.

DETAILED DESCRIPTION OF THE INVENTION

In accordance with the invention, it has been discovered that certain water soluble terpolymers, as shown in Formula I hereinafter, in combination with certain water soluble copolymers, as shown in Formula II hereinafter, are effective in controlling the deposition of scale and inhibiting the formation of corrosion in higher temperature (e.g., at 120° F. skin temperature) heat exchange zones of a cooling water system. These combinations are especially effective at temperatures in excess of 160° F.

The water soluble terpolymers of the invention have the structure:

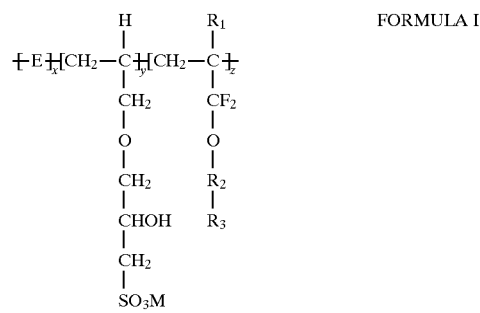

FORMULA I where E of Formula I comprises the repeat unit obtained after polymerization of an alpha, beta ethylenically unsaturated monomer, preferably a carboxylic acid, amide form thereof, or lower alkyl ($C_1$–$C_6$) ester or hydroxylated lower alkyl ($C_1$–$C_5$) ester of such carboxylic acids. Exemplary compounds encompassed by E include, but are not restricted to, the repeat unit formed by polymerization of acrylic acid, methacrylic acid, acrylamide, maleic acid or anhydride, fumaric acid, itaconic acid, 2-hydroxy-propyl acrylate, styrene sulfonic acid, and 2-acrylamido-2-methylpropanesulfonic acid and the like. Water soluble salt forms of these acids are also within the purview of the invention. $R_1$ in Formula I is H or lower ($C_1$–$C_4$) alkyl, F is $H_2$ or O, M is a water soluble cation, $R_2$ is $(CH_2-CH_2-O)_n$,

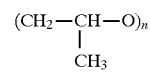

or mixture of both, n is an integer of from about 1 to about 40, $R_3$ is hydrogen, lower ($C_1$–$C_4$)alkyl, or an acetate formed as a cap on the polyethyleneglycol moiety by reacting an acetylating agent with an allyl ether polyethyleneglycol which is then reacted with the alpha, beta ethylenically unsaturated compound E to form the copolymer of Formula I. Suitable acetylating agents include acetic acid, acetic anhydride, acetyl chloride, and the like as described in U.S. Pat. Nos. 4,959,156 and 4,847,410 fully incorporated herein by reference.

Turning to monomer y in the above Formula, these types of monomers may generally be produced by reacting allyl alcohol with a non-tertiary alcohol in the temperature range of about 25°–150° C., as is detailed in U.S. Pat. No. 2,847,477 (the entire disclosure of which is hereby incorporated by reference). The allyl hydroxy propyl sulfonate ether (AHPSE) monomer disclosed may be prepared via a ring opening reaction of the epoxy group with sodium sulfite in the presence of a phase transfer catalyst such as tetra-n-butylammonium bisulfite or with fuming sulfuric acid containing sulfur trioxide which will produce the sulfonic acid group and the hydroxy group. The resulting monomer can be further neutralized with caustic or other basic material. The reaction is illustrated by the following mechanism:

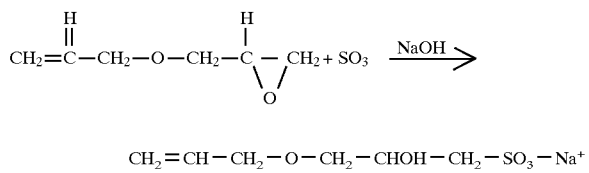

$$CH_2=CH-CH_2-O-CH_2-CHOH-CH_2-SO_3-Na^+$$

Monomer z is referred to as polyethylene glycol allyl ether (PEGAE) when F=$H_2$ and polyethylene glycol monomethacrylate (HEM) when F=O. PEGAE and HEM are prepared by ethoxylation of allyl alcohol and methacrylate ester, respectively. They are both commercially available from Rhone-Poulenc.

Polymerization of the monomers may proceed in accordance with conventional solution, precipitation or emulsion polymerization techniques. Conventional polymerization initiators such as azo compounds, persulfates, peroxides, UV light, etc., may be used. Chain transfer agents such as alcohols (preferably isopropanol), amine or mercapto compounds may be used to regulate the molecular weight of the polymer. The resulting polymer may be isolated by well known techniques including precipitation, etc. If polymerized in water, the polymer may simply be used in its aqueous solution.

The molar ratios of the three monomeric units x:y:z is approximately 1–10:1–4:1–4. The preferable ratio is in the range of 3–6:1–3:1–2.

The number average molecular weight of the water soluble or water dispersible terpolymers of Formula I is not critical and may fall within the Mn range of about 1,000 to 100,000, desirably 1,000 to 30,000 and more desirably 1,500 to 10,000. The key criteria is that the terpolymer be water soluble or water dispersible.

The water soluble copolymers of the invention have the structure:

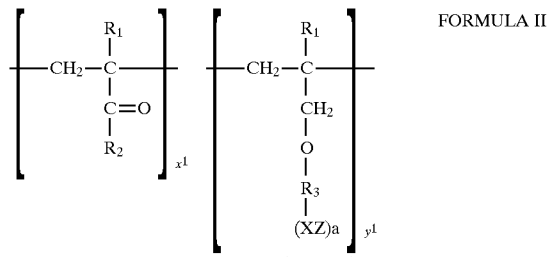

FORMULA II wherein $R_1$ is H or lower alkyl ($C_1$–$C_3$); $R_2$ is OH or OM, or $NH_2$; M is a water soluble cation; $R_3$ is a hydroxy substituted alkyl or alkylene radical having from 1 to 6 carbon atoms or a non-substituted alkyl or alkylene radical having from 1 to about 6 carbon atoms; X, when present, is an anionic radical selected from the group consisting of $SO_3$, $PO_3$, $PO_4$, and COO; Z, when present, is H or hydrogens or any water soluble cation or cations which together counterbalance the valence of the anionic radical; a is 0 or 1.

The number average molecular weight of the water soluble copolymers of FORMULA II may fall within the range of 1,000 to 1,000,000. Preferably the number average molecular weight will be within the range of from about 1,500 to 500,000, with the range of about 1,500 to about 10,000 being even more highly desirable. The key criterion is that the polymer be water soluble.

The molar ratio $x^1:y^1$ of the monomers of FORMULA II may fall within the range of between about 30:1 to 1:20, with the $x^1:y^1$ molar ratio range of from about 10:1 to 1:5 being preferred.

At present, the water soluble polymer preferred for use in cooling water systems is:

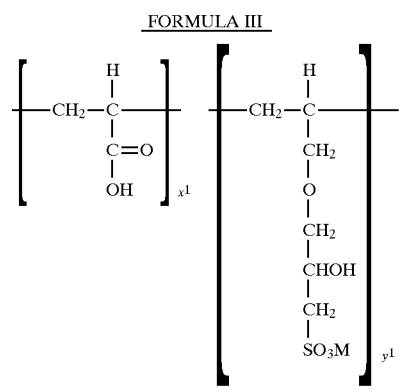

wherein M is the same as given in FORMULA II. This polymer (FORMULA III) is referred to as acrylic acid-/ally hydroxy propyl sulfonate ether (AA/AHPSE). The IUPAC nomenclature for AHPSE is 1-propane sulfonic acid, 2-hydroxy-3-(2-propenyl oxy)-mono sodium salt. Heretofore, the AHPSE monomer has been used in the emulsion polymerization of acrylate esters, vinyl acetate and styrene for the manufacture of latex paints.

With respect to both repeat units of the polymers of the present invention, they may exist in acid or water soluble salt form when used in the desired water system.

As to preparation of the monomer designated as $x^1$ above, in FORMULA II, acrylic acid is well known. It may be produced by hydrolysis of acrylonitrile or via oxidation of acrolein. Other well known vinyl containing monomers such as methacrylic acid and acrylamide may also be utilized as monomer $x^1$ of FORMULA I in accordance with the invention.

Turning to the allyl containing monomer, monomer $y^1$, in the FORMULA II above, these may be produced by reacting allyl alcohol with a non-tertiary alcohol in the temperature range of about 25°–150° C. as is detailed in U.S. Pat. No. 2,847,477 (the entire disclosure of which is hereby incorporated by reference) following by, if desired, sulfonation, phosphorylation, phosphonation or carboxylation of the monomer via well-known techniques. Further details of the copolymers of the present invention are found in U.S. Pat. No. 4,659,482, incorporated herein by reference.

The combination of the present invention should be added to the cooling water system, for which corrosion inhibiting, and/or deposit control activity is desired, in an amount effective for the purpose. This amount will vary depending upon the particular system for which treatment is desired and will be influenced by factors such as, the area subject to corrosion, pH, temperature, water quantity and the respective concentrations in the water of the potential scale and deposit forming species. For the most part, the combination of the present invention will be effective when used at levels of up to about 100 parts per million parts of water, and will be most effective when used at levels of up to about 15 parts per million parts of water. The combination may be added directly into the desired water system in a fixed quantity and in the state of an aqueous solution, continuously or intermittently.

The present invention can also be used with topping agent components in order to enhance the corrosion inhibition and scale controlling properties thereof. For instance the polymers may be used in combination with one or more kinds of compounds selected from the group consisting of phosphoric acids and phosphonic acids and water soluble salts thereof. Such topping agents may be added to the system in an amount of from about 1 to 500 ppm.

Examples of such phosphoric acids include condensed phosphoric acids and water soluble salts thereof. The phosphoric acids include an orthophosphoric acid, a primary phosphoric acid and a secondary phosphoric acid. Condensed phosphoric acids include polyphosphoric acids such as pyrophosphoric acid, tripolyphosphoric acid and the like, metaphosphoric acids such as trimetaphosphoric acid, and tetrametaphosphoric acid.

As to the other phosphonic acid derivatives which are to be added in addition to the present invention, there may be mentioned aminopolyphosphonic acids such as aminotrimethylene phosphonic acid, ethylenediaminetetramethylene phosphonic acid and the like, methylene diphosphonic acid, hydroxy ethylidene diphosphonic acid, 2-phosphonobutane 1,2,4 tricarboxylic acid, and hydroxy phosphonoacetic acid. The combination of polymers may be used in combination with yet other topping agent including corrosion inhibitors for iron, steel, copper, copper alloys or other metals, conventional scale and contamination inhibitors, and other conventional water treatment agents. Other corrosion inhibitors comprise tungstate, nitrites, borates, silicates, oxycarboxylic acids, catechols, zinc salts, molybdates and aliphatic amino surface active agents. Other scale and contamination inhibitors include lignin derivatives, tannic acids, starch, polyacrylic soda, polyacrylic amide, etc.

The combination of water soluble polymers may be added separately to the aqueous system or may be blended with the above topping agent compounds and then added in the state of aqueous solution into the water system either continuously or intermittently.

EXAMPLES

The invention will now be further described with reference to a number of specific examples which are to be regarded solely as illustrative and not as restricting the scope of the invention.

Calcium phosphate beaker screening was conducted with the polymer blend under both standard test conditions and also contaminant upset conditions; specifically, in the presence of two cations, iron and aluminum. The test water contained 400 ppm Ca, 100 ppm Mg (both as $CaCO_3$), 10 ppm orthophosphate and either 2 ppm $Fe^{2+}$ or 3 ppm $Al^{3+}$. The solution was adjusted to a pH of 8.2 and placed in a water bath at a temperature of 70° C. The polymer blend as well as each individual polymer was evaluated in this matrix at a total active polymer dosage of 5, 10,12 and 15 ppm. Filtered orthophosphate determinations were performed prior to test initiation to repeat the 10 ppm target level and, again after 18 hours into the test to determine the percent inhibition achieved. Results are shown in Tables I and II.

As shown in the tables, while all materials were very effective at the 15 ppm active dosage, the terpolymer blend of the present invention was especially effective at the lower tested concentrations. In the case of iron contamination, the blend provided 79% calcium phosphate inhibition at a 10 ppm total polymer dosage while the copolymer alone and the terpolymer alone provided only 55% and 4% inhibition, respectively, at the equivalent polymer level. A similar effect was noted in the presence of aluminum. At a total polymer dosage of 12 ppm, 84% calcium phosphate inhibition was achieved using the terpolymer blend. The copolymer and terpolymer alone both provided less inhibition, 59% and 33%, respectively.

TABLE I

Calcium Phosphate Inhibition Testing (3 ppm $Fe^{2+}$)

| | | % Inhibition at: | | | |
|---|---|---|---|---|---|
| Treatment | Ratios | 5 ppm | 10 ppm | 12 ppm | 15 ppm |
| AA/AHPSE (A) | 6/2 | 0 | 4 | 47 | 88 |
| AA/AHPSE/PEGAE = 10 (B) | 6/2/1 | 1 | 55 | 86 | 90 |
| 1A:1B | | 0 | 79 | 80 | 86 |

AA — acrylic acid
AHPSE — allyloxy-2-hydroxypropylsulfonic acid
PEGAE — polyethyleneglycol allyl ether, n = avg. number of glycol repeat units

TABLE II

Calcium Phosphate Inhibition Testing (3 ppm $Al^{3+}$)

| | | % Inhibition at: | | | |
|---|---|---|---|---|---|
| Treatment | Ratios | 5 ppm | 10 ppm | 12 ppm | 15 ppm |
| AA/AHPSE (A) | 6/2 | 2 | 2 | 59 | 84 |
| AA/AHPSE/PEGAE = 10 (B) | 6/2/1 | 1 | 2 | 33 | 98 |
| 1A:1B | | 1 | 4 | 84 | 94 |

Recirculator Testing for Scale and Corrosion Inhibition

Further dynamic testing was conducted under recirculating, heat transfer conditions in the Bench Top Units (BTU's). The test water for these evaluations contained 600 ppm calcium, 300 ppm magnesium, 50 ppm M-alkalinity (all as $CaCo_3$), 425 ppm chloride, 288 ppm sulfate, and 28 ppm sodium at a pH of 7.2 and a specific conductance of approximately 2100 umhos. The treatments tested contained 15 ppm inorganic phosphate, 1.5 ppm phosphonate, 3 ppm tolyltriazole, and either 4 ppm of AA/AHPSE or 4 ppm of a 1:1 blend of AA/AHPSE and the AA/AHPSE/PEGAE terpolymer. The BTU operating parameters also included a bulk temperature of 120° F., a heat transfer rate of 8,000 BTU/(ft²hr) across a mild steel surface, a retention time of 1.4 days (75% depletion), and a water velocity of 2.8 ft/sec. past all test metallurgy.

Iron testing was carried out by an initial shot feed of 0.25 ppm $Fe^{2+}$ to the BTU sump with subsequent continuous syringe feed of an iron solution (40 ppm $Fe^{2+}$) in order to maintain a sump iron level of 0.5 ppm. Under this contaminant condition, there was a significant performance difference between the AA/AHPSE and the blend. This is demonstrated in Table III. The AA/AHPSE simulation resulted in both increased solution turbidity and heat transfer fouling relative to the blend at the end of the seven day test duration. The final solution turbidity was 10.5 ntu using the AA/AHPSE copolymer, versus 1.3 ntu using the blend. This difference in turbidity was responsible for the amount of fouling experienced by the respective heat transfer surfaces, i.e., severe calcium phosphate, heat transfer deposition with AA/AHPSE compared to only very slight deposition with the polymer blend. Also, the soluble phosphate levels for these tests indicated superior phosphate stabilization with the blend, i.e., a final soluble phosphate level of 10.7 ppm with the AA/AHPSE copolymer compared to 14.4 ppm with the blend.

TABLE III

| | Polymer Comparison - Iron Upset | |
|---|---|---|
| Treatment | Ratios | Turbidity (ntu) |
| AA/AHPSE (A) | 6/2 | 10.5 |
| 1A:1B | | 1.3 |

Aluminum testing was conducted using the same test water, treatments, and BTU operating parameters as described above but using both a 1 ppm $Al^{3+}$ and 3 ppm $Al^{3+}$ contaminant concentration. These results are shown in Table IV. Overall, less solution turbidity and heat transfer fouling were evident with the blend relative to AA/AHPSE. The polymer blend and AA/AHPSE alone realized final solution turbidities of 0.6 ntu and 2.4 ntu, respectively, in the presence of 1 ppm $A^{3+}$. A similar trend was also obvious during the 3 ppm $Al^{3+}$ studies (0.68 ntu with the blend and 1.5 ntu with AA/AHPSE), but the turbidity differences were not as pronounced as before.

TABLE IV A

| | Polymer Comparison - Aluminum Upset (1 ppm $Al^{3+}$) | |
|---|---|---|
| Treatment | Ratios | Turbidity (ntu) |
| AA/AHPSE (A) | 6/2 | 2.4 |
| 1A:1B | | 0.6 |

TABLE IV B

| | Polymer Comparison - Aluminum Upset (3 ppm $Al^{3+}$) | |
|---|---|---|
| Treatment | Ratios | Turbidity (ntu) |
| AA/AHPSE (A) | 6/2 | 1.5 |
| 1A:1B | | 0.68 |

It is expected that the treatment of the present invention will also be effective under such conditions as high silica content and in the presence of certain biocides.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

We claim:

1. A method for simultaneously controlling the deposition of scale and the formation of corrosion in a cooling water system comprising adding to said system an effective amount for the purpose of a combination of (a) a water soluble terpolymer having the structure:

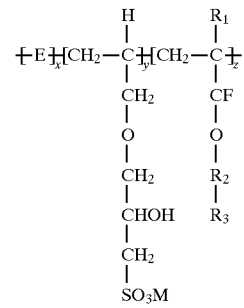

wherein E is a repeat unit obtained after polymerization of an alpha, beta ethylenically unsaturated carboxylic acid or sulfonic acid monomer, amide form thereof, or lower alkyl $(C_1-C_6)$ ester or hydroxylated lower alkyl $(C_1-C_5)$ ester of said carboxylic acid, and salts thereof, the molar ratio of x:y:z is approximately 1–10: 1–4: 1–4, $R_1$ is H or lower $(C_1-C_4)$alkyl, F is $H_2$ or O, M is a water soluble cation, $R_2$ is $(CH_2-CH_2-O)_n$,

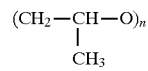

or mixture of both, n is an integer of from about 1 to about 40, $R_3$ is H, lower $(C_1-C_4)$ alkyl or an acetate, and (b) a water soluble acrylic acidallylhydroxypropyl sulfonate ether copolymer or water soluble salt form thereof, said copolymer having the formula:

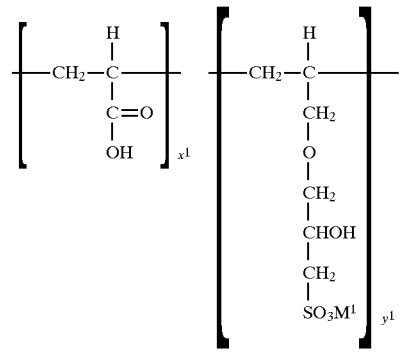

wherein $M^1$ is a water soluble cation, the weight ratio of (a):(b) is about 1:1, and the molar ratio $x^1:y^1$ is from about 3:1–6:1.

2. The method as recited in claim 1 wherein the terpolymer has a molecular weight (Mn) of between about 1,000 and 100,000.

3. The method as recited in claim 2 wherein the terpolymer has a molecular weight (Mn) of between about 1,000 and 30,000.

4. The method as recited in claim 3 wherein the terpolymer has a molecular weight (Mn) of between about 1,500 and 10,000.

5. The method as recited in claim 1 wherein the combination is added to the water in the cooling water system in an amount of 0.1–100 parts polymer based upon 1 million parts of the water.

6. The method as recited in claim 5 wherein the combination is added to the cooling water system in an amount of 0.1–15 parts based upon 1 million parts of the water.

7. The method as recited in claim 1 wherein the molar ratio of x:y:z is approximately 3–6:1–3:1–2.

8. The method as recited in claim 1 wherein E is selected from the group consisting of acrylic acid, methacrylic acid, acrylamide, maleic acid, maleic anhydride, fumaric acid, itaconic acid, 2-hydroxy propyl acrylate, styrene sulfonic acid, 2-acrylamido-2-methylpropanesulfonic acid and salts thereof.

9. The method as recited in claim 1 wherein monomer z is selected from the group consisting of polyethylene glycol allyl ether and polyethylene glycol monomethacrylate.

10. The method as recited in claim 1 wherein said copolymer has a number average molecular weight of from about 5,000 to 10,000.

* * * * *